United States Patent [19]

Pokhodnya et al.

[11] 4,225,773

[45] Sep. 30, 1980

[54] CORED ELECTRODE

[76] Inventors: Igor K. Pokhodnya, ulitsa Chkalova, 41-a, kv. 25; Vladimir P. Ananin, ulitsa Solomenskaya, 41, kv. 83; Vladimir N. Golovko, ulitsa Vladimirskaya, 9, kv. 29, all of Kiev; Sergei I. Denisov, bulvar Gvardeisky, 145, kv. 41, Zaporozhie, all of U.S.S.R.

[21] Appl. No.: 26,457

[22] Filed: Apr. 2, 1979

Related U.S. Application Data

[63] Continuation of Ser. No. 790,998, Apr. 26, 1977, abandoned.

[51] Int. Cl.$^2$ ............................................. B23K 35/22
[52] U.S. Cl. .................................. 219/146.3; 219/74; 219/145.22; 219/146.32
[58] Field of Search ............ 219/145.22, 146.3, 146.32, 219/146.31

[56] References Cited

U.S. PATENT DOCUMENTS

| | | | |
|---|---|---|---|
| 2,504,630 | 4/1950 | Bienfait et al. | 219/8 |
| 2,831,790 | 4/1958 | Pumphrey | 148/23 |
| 2,876,074 | 3/1959 | Johnson | 106/51 X |
| 2,878,114 | 3/1959 | Udy | 106/51 X |
| 3,418,446 | 12/1968 | Claussen | 219/130 |
| 3,480,487 | 11/1969 | Coless | 148/23 X |
| 3,733,458 | 5/1973 | Pokhodnya et al. | 219/146 |

FOREIGN PATENT DOCUMENTS 858854  1/1961  United Kingdom ...................... 219/146

Primary Examiner—Richard R. Kucia
Attorney, Agent, or Firm—Fleit & Jacobson

[57] ABSTRACT

A continuous cored electrode includes a sheath which encloses a core formed of a granular material of the following composition, in percent by weight:

| | |
|---|---|
| feldspar | from 1.8 to 10.4 |
| sodium fluosilicate | from 1.6 to 10.0 |
| ferromanganese | from 13.0 to 20.0 |
| ferrosilicon | from 0.6 to 1.6 |
| reduced titanium concentrate | from 58 to 83. |

The proposed cored electrode is well suited for use in the $CO_2$ welding of low-carbon and low-alloy steels.

2 Claims, No Drawings

CORED ELECTRODE

This application is a continuation of Ser. No. 790,998 filed Apr. 26, 1977, now abandoned.

The present invention relates to welding, and more particularly to continuous cored electrodes for use in $CO_2$ welding.

The proposed invention is especially well suited for use in the welding of metal constructions from low-carbon and low-alloy steels.

BACKGROUND OF THE INVENTION

For example, there are known continuous cored electrodes for $CO_2$ welding, the core material of which electrodes include deoxidizing as well as slag-forming elements, and a stabilizing agent/cf. U.S.S.R. Inventor's Certificate No. 285,801, No. 312,717, France Pat. No. 1,517,199, U.S. Pat. No. 3,418,446.

Excellent welding performance and reliable weld forming as well as insignificant spattering of metal during welding operation, are the features inherent in continuous cored electrodes, in which the core material includes titania rutile, and which are disclosed in U.S.S.R. Inventor's Certificate No. 285,801, and in U.S. Pat. No. 3,418,446.

The cored electrode described in the U.S.S.R. Inventor's Certificate No. 285,801 referred to above comprises a tubular sheath enclosing core material containing the following ingredients, in percent by weight:

| Rutile | from 20 to 40 |
| --- | --- |
| Ferromanganese | from 10 to 13 |
| Feldspar | from 0.6 to 6.0 |
| Sodium flousilicate | from 0.6 to 4.5 |
| Ferrosilicon | from 0.6 to 2.0 |
| Iron powder | the balance. |

According to the aforecited U.S. Pat. No. 3,418,446, the continuous cored electorde comprises a tubular sheath enclosing granular core material containing the following ingredients:

|  | Percent by weight of the total core |
| --- | --- |
| Rutile | 55 |
| Ferrosilicon | 14 |
| Manganese | 16 |
| Magnetite | 15 |

The known cored electrodes, if utilized for $CO_2$ welding of metal constructions using up to 800 amperes and a welding rate of 100 meters per hour, display a number of basic disadvantages, namely:

the formation of filled weld, using a current of over 500 amperes, turns out unsatisfactory because of weld upsets and undercuttings which appear respectively, at welding rates of up to 50 m/hr and over 70 m/hr;

welding with the known cored electrodes, using over 600 amperes, does not ensure high weld bend ductility, and in particular, weld impact resistance at negative temperatures.

The elimination of the non-uniform fusion of the electrode core and sheath is generally effected in the following manner:

first, either by using electrode wires with a complex-shaped sheath, twin wire electrode cf. U.S.S.R. Inventor's Certificate No. 203,111;

or by using iron powder as the ingredient of the electrode core material.

In the first instance, the process of making such cored electrodes becomes more complicated, the second one suffering from a number of disadvantages, namely:

potential content of gases is increased in the electrode core, said gases, such as oxygen, nitrogen and hydrogen, being introduced therein by the iron powder, which impairs mechanical properties of both the weld metal and weld seam;

because of the developed contact surface of the iron powder, and due to the presence of the oxidized layer on the surfaces of particles, electric resistance of the electrode core remains considerably high as compared to that of the core sheath, resulting in non-uniform fusion of the core sheath and material.

The primary object of the present invention is to provide a continuous cored electrode which makes it possible to eliminate non-uniform fusion of the core sheath and material.

Another object of the invention is to provide a continuous cored electrode which ensures satisfactory formation of fillet welds under heavey-duty welding conditions.

Still another object of the invention is to provide a continuous cored electrode which provides for higher weld and metal weld impact resistance under heavy-duty welding conditions.

These and other objects and advantages of the invention are attained in a continuous cored electrode comprising a low-carbon steel sheath member and a core in the form of granular material including the following ingredients: feldspar, sodium fluosilicate, ferromanganese, ferrosilicon, and reduced titanium concentrate, said ingredients being present in the following amounts:

|  | Percent by weight of the total core |
| --- | --- |
| Feldspar | from 1.8 to 10.4 |
| Sodium fluosilicate | from 1.6 to 10.0 |
| Ferromanganese | from 13.0 to 20.0 |
| Ferrosilicon | from 0.6 to 1.6 |
| Reduced titanium concentrate | from 58 to 83 |

With the purpose of increasing both the weld, and weld bend ductility, the electrode core material additionally contains ferrotitanium in an amount of 2.6 to 5.2 percent by weight, the remaining ingredients being present in the following amounts:

|  | Percent by weight of the total core |
| --- | --- |
| Feldspar | from 2.2 to 10.1 |
| Sodium fluosilicate | from 1.6 to 10.6 |
| Ferromanganese | from 13.0 to 20.0 |
| Ferrosilicon | from 0.6 to 1.6 |
| Reduced titanium concentrate | from 53 to 80. |

It is known that reduced titanium concentrate is made up of transition titanium oxides, 70–75 wt.%, such as $Ti_3O_5$ and $Ti_4O_7$, which differ from $TiO_2$, titanium dioxide, the base component of rutile, in that said oxides show higher electric conductivity by $10^6$ times. This factor makes it possible to eliminate non-uniform fusion of the electrode core material during a welding process employing a current of up to 800 amperes. The reduced titanium concentrate also contains metallic iron, 20–25 wt.% characterized by high dispersity and uniform distribution in the grains of the base. The presence of metallic iron enables the amount of deposited metal to be increased. The reduced titaium concentrate in the indicated amount provides for satisfactory weld formaclosed in the U.S.S.R. Inventor's Certificate No. 280,801, a good quality fillet weld with a leg length of 5 mm is obtained at a welding rate of 50 meters per hour, using 500 amperes.

The mechanical properties of the weld metal deposited with this electrode on low-carbon steel containing in percent by weight: hydrogen—0.11, manganese—0.6, silicon—0.2, sulphur—0.02, and phosphorous—0.02 were as follows:

| Welding current and voltage | | Tensile-shear strength, | Relative elongation, | Impact strength, kg-m per square meter,/annular notch/ | | |
|---|---|---|---|---|---|---|
| Amperes | Volts | kg/mm$^2$ | percent | +20° C. | −20° | −40° C. |
| 600 | 35 | 57.3–58.1 | 21.2–23.0 | 10.5–11.7 | 8.5–9.6 | 7.5–8.1 |
| | | 57.1 | 22.1 | 10.8 | 9.1 | 8.3 |
| 800 | 42 | 55.3–56.2 | 20.1–21.7 | 9.5–10.2 | 7.8–9.2 | 5.2–6.3 |
| | | 55.9 | 20.8 | 9.8 | 8.6 | 5.4 | tion and a stable arc accompanied by insignificant metal spattering, even when using currents of up to 800 amperes, while making best use of improved working properties of slag, such as its covering ability and an optimum crystallization range. The aforesaid property of the reduced titanium concentrate has been found to be effective when used as a part of the core material in combination with feldspar contained in the amount mentioned above. In addition, being high in potassium and sodium oxides the feldspar functions to stabilize welding arc.

The sodium fluosilicate, contained in the core material, functions to bond the hydrogen, present in the arc burning zone, into an insoluble in molten metal fluohydric compound. The presence of sodium fluosilicate in the core material in the amount indicated results in the formation of porosity caused by hydrogen; of the sodium fluosilicate content exceeds that mentioned above, the arc burning stability is impaired and the electrode metal spattering is increased.

The ferromanganese and ferrosilicon present in the aforecited amounts provide for deoxidation and alloying processes required for obtaining prescribed weld strength and bend ductility characteristics. The ferrotitanium, when present in the indicated amount, enables refinement of the metal weld structure, thus increasing ductility, or weld impact resistance.

The advantages of the present continuous cored electrode over the prior-art cored electrodes is illustrated by the following examples.

EXAMPLE 1

A continuous cored electrode of 2.5 mm in diameter, comprising a low-carbon steel sheath member constituting about 80% by weight of the total weight of the electrode, and a core including the following ingredients, in percent by weight:

| | |
|---|---|
| reduced titanium concentrate | 62.0 |
| feldspar | 9.4 |
| sodium fluosilicate | 9.0 |
| ferromanganese | 18.0 |
| ferrosilicon | 1.6 |

Welding carried out with this electrode, using 35 volts and 600 amperes and 30 to 40 cubic feet of $CO_2$ per hour, should a good quality fillet weld with a leg length of 7 mm at a welding rate of 80 meters per hour. In the process of welding carried out with the electrode dis-

EXAMPLE 2

A continuous cored electrode of 3 mm in diameter comprising a low-carbon steel sheath member constituting 75% by weight of the total weight of the electrode, and a core including the following ingredients, in percent by weight:

| | |
|---|---|
| reduced titanium concentrate | 81 |
| feldspar | 2 |
| sodium fluosilicate | 1.8 |
| ferromanganese | 14.6 |
| ferrosilicon | 0.6 |

The welding carried out with this electrode using 45 volts and 780 amperes and 30 to 40 cubic feet of $CO_2$ per hour, assures a good quality fillet weld with a leg length of 7 mm, at a welding rate of 90 meters per hour.

The mechanical properties of the weld metal deposited with this electrode on low-carbon steel containing, in percent by weight: 0.15 hydrogen, 0.77 manganese, 0.78 silicon, 0.85 chrome, 0.7 nickel, 0.5 copper, 0.020 sulphur and 0.028 phosphorous are as follows:

| Tensile-shear strength, kg/mm | Relative, elongation, % | Impact strength, kg-m/cm$^2$ /annular notch/ | | |
|---|---|---|---|---|
| | | +20° C. | −20° C. | −40° C. |
| 58.7–59.6 | 22.4–23.1 | 9.6–11.3 | 8.2–10.1 | 6.9–8.7 |
| 59.1 | 22.7 | 10.8 | 9.2 | 7.8 |

Thus, the $CO_2$ welding efficiency achieved by using the proposed continuous cored electrode is 1.5 to 2 times as much as that of the prior-art electrodes, made possible due to the increased amount of the metal deposited during welding with currents of up to 800 amperes, as well as due to to increased line speeds of welding.

Improved weld metal notch toughness, achieved with ferrotitanium present in the composition of the electrode core material, is illustrated by the following examples:

EXAMPLES 3 AND 4

A continuous cored electrode of 2.5 mm in diameter, comprising a low-carbon steel sheath member containing 80% by weight of the total weight of the electrode and a core including the following ingredients in percent by weight:

|  | Example 3 | Example 4 |
| --- | --- | --- |
| reduced titanium concentrate | 61.0 | 61.0 |
| feldspar | 9.4 | 9.4 |
| sodium fluosilicate | 9.0 | 9.0 |
| ferromanganese | 17.0 | 15.0 |
| ferrosilicon | 0.8 | 0.6 |
| ferrotitanium | 2.8 | 5.0 |

The impact properties obtained during welding of low-alloy steel of 16 mm in thickness, containing in percent by weight: 0.10% hydrogen, 1.8% manganese, 0.7% silicon, 0.022% sulphur and 0.022% phosphorus, as compared to the electrode with the composition of the core material thereof being set forth in Example 1, are as follows:

| Welding electrode | Impact strength, kgm/cm$^2$/annular notch/ at a temp. | | |
| --- | --- | --- | --- |
|  | +20° C. | −20° C. | −40° C. |
| According to Ex.1 | 10.2–11.6 / 10.8 | 9.1–10.3 / 9.5 | 7.8–8.9 / 8.1 |
| According to Ex. 3 | 12.0–13.4 / 12.6 | 11.3–12.4 / 11.8 | 10.4–11.6 / 10.8 |
| According to Ex. 4 | 14.1–15.3 / 14.6 | 12.1–13.7 / 12.8 | 10.9–11.7 / 11.2 |

Welding current was 720 amperes, and voltage was 39 volts.

Thus, the use of ferrotitanium makes it possible to increase impact strength and improve quality of the weld metal and seam.

From the foregoing description of the invention, illustrated by the accompanying examples, it follows that the proposed continuous cored electrode is particularly suitable for use in the welding of plain carbon and low alloy steels using a $CO_2$ gas shield and enhances the welding capacity and improves quality of the weld metal and seam.

What is claimed is:

1. A continuous cored electrode for $CO_2$ welding of plain carbon and low alloy steels comprising a hollow low-carbon steel sheath member and a core consisting of granular material filling said hollow sheath member, said core consisting essentially of the following ingredients present in the following amounts:

|  | Percent by weight of the total core |
| --- | --- |
| Feldspar | from about 1.8 to 10.4 |
| Sodium fluosilicate | from about 1.6 to 10.0 |
| Ferromanganese | from about 13.0 to 20.0 |
| Ferrosilicon | from about 0.6 to 1.6 |
| Reduced titanium concentrate | from about 53 to [80] 83. |

2. A continuous cored electrode as claimed in claim 1, wherein the core material also contains ferrotitanium in an amount of from about 2.6 to 5.2 percent by weight of the core.

* * * * *